(12) United States Patent
Nair

(10) Patent No.: US 7,126,387 B2
(45) Date of Patent: Oct. 24, 2006

(54) METHOD AND APPARATUS FOR DRIVING LOW INPUT IMPEDANCE POWER TRANSISTOR SWITCHES

(76) Inventor: Rajendran Nair, 3838 E. Encinas Ave., Gilbert, AZ (US) 85234

( * ) Notice: Subject to any disclaimer, the term of this patent is extended or adjusted under 35 U.S.C. 154(b) by 0 days.

(21) Appl. No.: 10/794,625

(22) Filed: Mar. 8, 2004

(65) Prior Publication Data

US 2004/0196075 A1     Oct. 7, 2004

Related U.S. Application Data

(60) Provisional application No. 60/460,391, filed on Apr. 7, 2003.

(51) Int. Cl.
*H03K 3/00* (2006.01)
(52) U.S. Cl. .................. 327/108; 323/282
(58) Field of Classification Search ........ 327/108–112; 323/282–283
See application file for complete search history.

(56) References Cited

U.S. PATENT DOCUMENTS 6,424,128 B1 * 7/2002 Hiraki et al. ............ 323/268
6,489,758 B1 * 12/2002 Moriconi et al. ........ 323/288
6,778,416 B1 * 8/2004 Bruno ..................... 363/89
6,812,782 B1 * 11/2004 Grant ...................... 327/589
6,940,189 B1 * 9/2005 Gizara .................... 307/151

* cited by examiner

Primary Examiner—Kenneth B. Wells

(57) ABSTRACT

An adaptable, low-power drive circuit for transistor switches requiring control input current is disclosed. In one embodiment of the invention, a current source output replaces the prior art voltage drive circuits and associated external current-limiting resistor. The current-source drive circuit provides both a high impedance as well as variability. The high impedance of the current-source drive circuit enables a reduction in the value of the resistance-bypass capacitor employed in the prior art. The variability in the output current provided by the current-source circuit allows the drive circuits to optimize the control current flowing into the switch device as the characteristics of the switch device change with operating temperature. The drive circuit is capable of providing as output either a desired current, at a high output impedance, or a desired voltage, at a low output impedance, employing a shared amplifier and output transistor. The drive circuit also derives current from the much lower output voltage of the buck conversion system that the invention is used in. This minimizes the static power dissipated in driving the switch, and also minimizes the energy expenditure incurred in increasing the output current to modulate the power switch resistance that increases with increasing temperature.

13 Claims, 3 Drawing Sheets

Illustration of the use of an embodiment of the invention in a buck regulator for DC-to-DC conversion

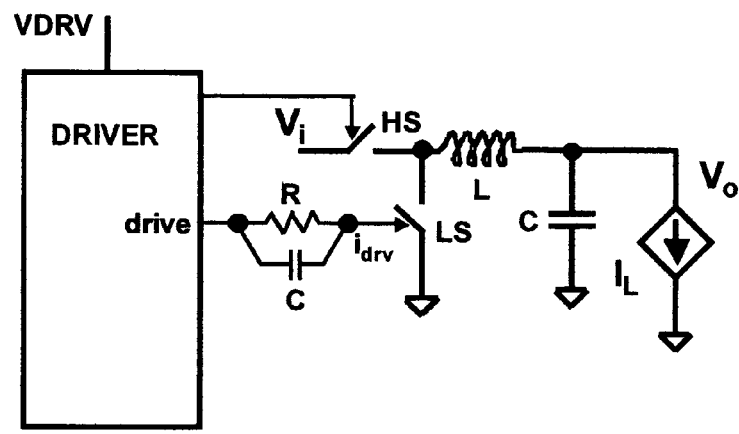
Figure 1: Prior art RC-based drive architecture for power-JFET devices used as the low-side (LS) switch in a buck regulator
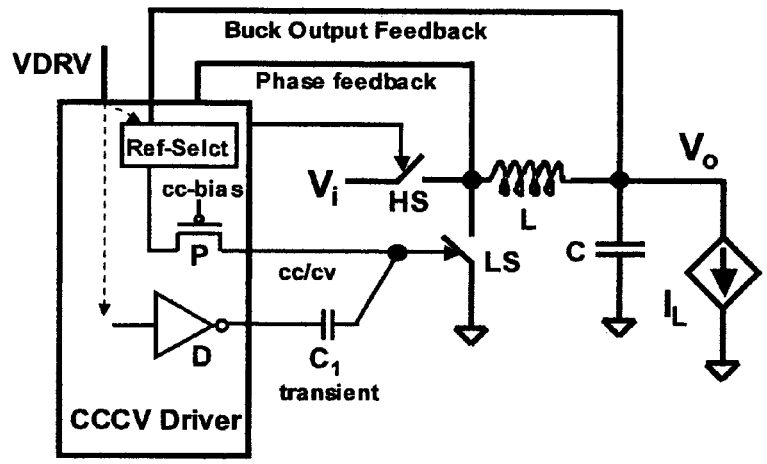
Figure 2: Illustration of the use of an embodiment of the invention in a buck regulator for DC-to-DC conversion

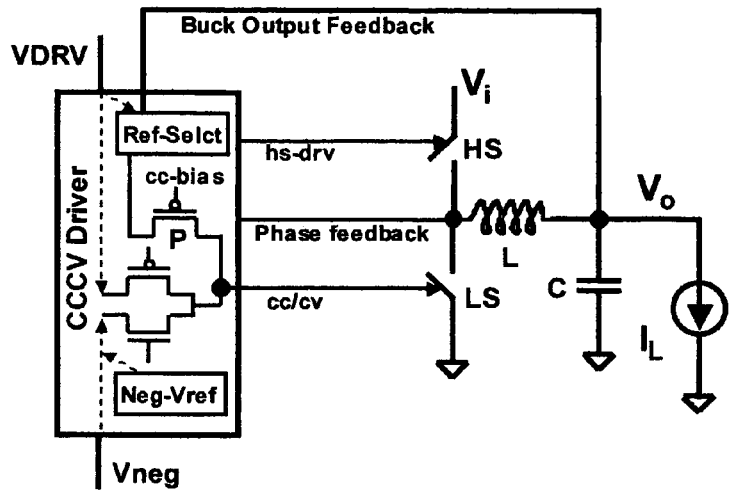
Figure 3: Illustration of an alternate invention embodiment in a buck regulator
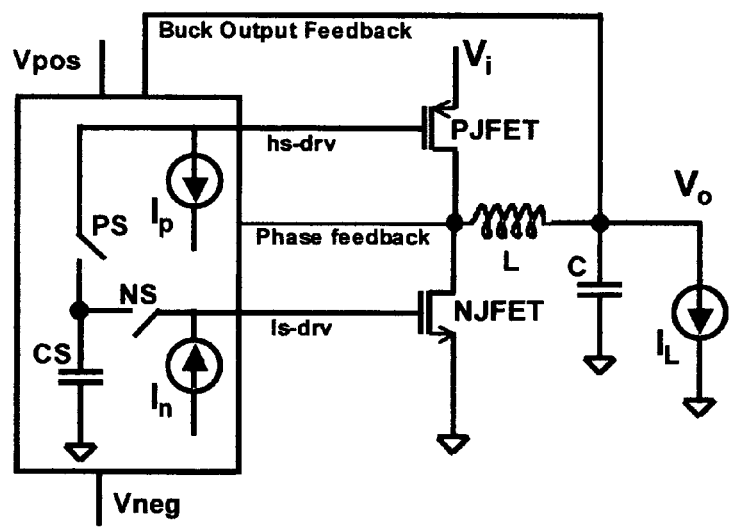
Figure 4: Alternate embodiment illustrating charge re-use from capacitor 'CS'

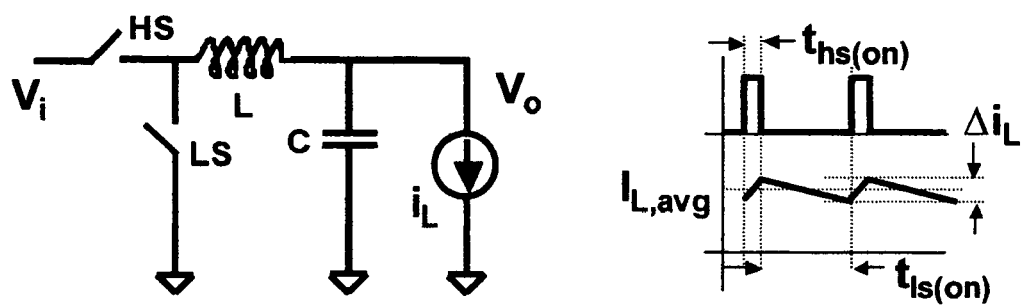
Figure 5: Illustration of buck regulator functionality

METHOD AND APPARATUS FOR DRIVING LOW INPUT IMPEDANCE POWER TRANSISTOR SWITCHES

CROSS-REFERENCE TO RELATED APPLICATIONS

1. This application is a continuation of Provisional Patent Application 60/460,391 filed on Apr. $7^{th}$, 2003, entitled "Method, system and apparatus for constant current constant voltage drive".
2. The application also relates to invention disclosure document USPTO 528845 dated the $30^{th}$ of Mar. 2003.

TECHNICAL FIELD OF THE INVENTION

Embodiments of the invention relate to electronic circuitry commonly employed to provide regulated voltages to other electronic, electromechanical or electro-optic devices and systems. Such circuitry falls under the broad category of power management electronics.

BACKGROUND & PRIOR ART

PN (p-type abutting n-type) semiconductor junctions are ubiquitous in the industry and play a principal role in electronic devices such as Diodes, Silicon-Controlled Rectifiers, Thyristors, Bipolar Junction Transistors (BJTs), Junction Field Effect Transistors (JFETs), and in optoelectronic devices such as Light-Emitting Diodes (LEDs) and Vertical Cavity Surface-Emitting Lasers (VCSELs). Electronic circuits that activate ('drive') the PN junctions are also common in the art and vary from resistor-divider circuits employed for BJT-based circuits to current-pulse circuits employed where only a transient activation of the junction is required. PN junctions display a 'rectifying' property, conducting electric current in one direction and blocking it in the opposite direction. In transistors, the PN junction labeled the 'base' in BJTs or the 'gate' in JFETs functions as the control location that regulates current flow through the device.

Activating the PN junction that functions as the control input for BJT's or JFETs often requires the flow of static current through the junction. For example, a BJT device employed to regulate the current flow through an electronic circuit will allow a current to pass through it that is a multiple of the device current gain, $\beta$ and the current flowing into the base PN junction. Another example is that of an 'enhancement-mode', normally-off JFET device wherein a conduction channel is formed by the injection of a current into it's gate PN junction.

Other types of transistor devices exist wherein a static current flow into the control-input is not required for the operation of the devices. Examples of such devices are MOSFET and 'depletion-mode' JFET devices. Static current flow into the control input of a transistor device is, in some applications, an undesirable characteristic of the circuit and an unwanted expenditure of energy. Nevertheless, the principal characteristics of devices requiring control-input current, such as current-gain, low output resistance, speed of operation, simplicity and low-cost nature of manufacture etc., may prove to be attractive enough for their use despite the burden of the control-input current. It is desired in such cases that the energy expended due to the control-input current (in PN junction base or gate drive) be minimized in order to improve overall operational efficiencies and to minimize cost. Alternately, it may be desired that a facility to vary the control-input current is made available, that incurs minimal additional energy expenditure, and that does not depend upon external components.

In certain applications, minimizing the energy loss due to the gate drive current is critical to the quality of the solution. An example is the use of enhancement-mode or depletion-mode JFET switches in DC-to-DC conversion applications, a technology currently in the commercialization phase [1]. Of specific relevance is a class of converters called 'buck' DC-to-DC converters. These converters transform an input voltage into a lower output voltage through the use of switches that convey the input voltage, pulse-width modulated, into an energy-storing output filter. Common examples of the use of such converters are microprocessor power supplies. Maintaining high efficiencies in power supply voltage conversion is critical in such applications due to the costs associated with managing thermal dissipation within the system. The use of enhancement-mode JFET switches in buck conversion results in additional energy expense (as compared with MOSFET switches) due to the static drive current requirement. Certain JFET devices [1] may require as much as 40 mA of gate drive to cause the ON resistance of the device to reduce to 4.5 milliohms with the device conducting 10 A of current. With the control input driver circuit operating from a 5V supply, the static power consumption is 200 milliwatts, while the power consumption in the device channel due to current flow is 450 milliwatts. Assuming a 1V output from the buck converter, and a 20% 5V input duty cycle (or an 80% duty cycle for a switch device on the ground-side of the converter) in a 5V to 1V conversion, this drive power into the switch device alone is seen to contribute to a reduction in efficiency of 1.6%. In systems requiring extremely high conversion efficiency, such as battery operated computing devices, or thermally constrained systems, this loss in efficiency makes the JFET-based solution unattractive.

FIG. 1 illustrates the prior art interconnection of a driver circuit and the control input of a PN-junction gated device such as a BJT or a power-JFET. The interconnection of interest is the signal labeled 'drive' emanating from the driver circuits through the parallel combination of the resistance R and the capacitance C into the control input of the switch device labeled LS (for low-side). In this prior art drive circuit, resistance R limits the current flow into device LS and capacitance C enables faster turn-on and turn-off as well as in maintaining the device LS in it's 'off' state. For example, when the driver circuits determine that device LS is to be turned off, signal drive is brought down to ground from its high value (typically the value of power input VDRV). This negative transition in voltage couples through capacitance C into the input capacitance of device LS and produces a negative bias at this input node. But the presence of resistance R complicates matters in this prior art implementation by decaying this negative charge deposited at the input node of LS back into the signal drive, which is now at the ground potential. This decay is detrimental in systems employing JFETs because such JFETs may need a constant negative bias at their control gate to maintain the device in its 'off' or non-conducting state. This places a lower limit on the operating frequency of the switching conversion system. But because systems may desire to reduce the operating frequency to reduce $C \cdot V^2 \cdot f$ losses in conditions of lower power consumption, this constraint is undesirable. Also, devices R and C are external components, and because of their large values, may not allow integration into the driver.

The invention specifies an innovative circuit architecture that successfully addresses the problems discussed above.

SUMMARY OF THE INVENTION

The invention is a novel drive circuit and system architecture that minimizes the additional energy expense in driving power switch devices that require control-input currents and facilitates variation in the drive current for improved switch and system performance.

In one embodiment of the invention, a current source output replaces the prior art voltage drive circuits and associated external current-limiting resistor. The current-source drive circuit provides both a high impedance as well as variability. The high impedance of the current-source drive circuit enables a reduction in the value of the resistance-bypass capacitor employed in the prior art. The variability in the output current provided by the current-source circuit allows the drive circuits to optimize the control current flowing into the switch device as the characteristics of the switch device change with operating temperature. The drive circuit is capable of providing as output either a desired current, at a high output impedance, or a desired voltage, at a low output impedance, employing a shared amplifier and output transistor. The drive circuit also derives current from the much lower output voltage of the buck conversion system that the invention is used in. This minimizes the static power dissipated in driving the switch, and also minimizes the energy expenditure incurred in increasing the output current to modulate the power switch resistance that increases with increasing temperature.

In another embodiment of the invention, multiple current sources are employed in parallel to drive the power switch control input, eliminating the need for the external capacitor as well. As in the first embodiment, a current source maintains the power switch in it's 'ON' condition by means of a variable current drive, a current source to a voltage reference of the opposite polarity is employed to maintain the device in it's 'OFF' state and transient current sources are employed to rapidly transition the power switch device between it's binary states of operation. In this embodiment, the output voltage of the buck conversion system, by definition lower than the input voltage to the system, is employed for the turn-on action of the switch, and an external reference or an internally generated voltage of the opposite polarity is employed to transition to a turn-off mode. Available low-impedance voltage references such as the input power supply to the system and the system ground are employed for the transient drive actions that facilitate rapid transition between the modes.

BRIEF DESCRIPTION OF THE FIGURES

FIG. 1 is an illustration of prior art drive architecture for a JFET power switch.

FIG. 2 is an illustration of one embodiment of the invention. The figure shows the feedback of the output of the buck conversion system to the invention embodiment as well as the elimination of the current-limiting resistor of the prior art in the current-based drive output path.

FIG. 3 is an illustration of an alternate embodiment of the invention. It shows the elimination of the 'transient drive' capacitor through the inclusion of additional, parallel current sources into the output drive path of the invention.

FIG. 4 is an illustration of an alternate embodiment of the invention employing a capacitor for charge re-use in driving high-side and low-side switches of a buck conversion topology.

FIG. 5 is an illustration of the architecture and functionality of a buck converter.

DETAILED DESCRIPTION OF THE INVENTION

For purposes of illustration, unless explicitly specified, the description herein will assume that N-type JFET power switches are used, where the channel is formed by electron-donor or n-type semiconductor material and the gate junction is formed by the deposition of p-type material.

FIG. 1 illustrates prior art drive architecture for the low-side (LS) JFET power switch of a buck converter. A resistor R is employed in series between the output of the driver circuits at node drive and the control gate input of the switch labeled LS. The resistance value of R and the driver power supply value VDRV determine the amount of forward current flowing into the JFET power switch in order to turn it on. One skilled in the art can appreciate that the current flowing into the gate input of the switch is substantially dependent upon the value of the driver power supply, the accuracy and the temperature characteristics of the external resistor as well as the nature of the PN junction of the JFET power switch that is also dependent upon temperature. In this manner, the driver circuits themselves have very little control over the value of this current, represented by id, in the figure, or the voltage that is developed across the PN junction gate of the JFET power switch which in turn determines the $R_{ds(on)}$ or the JFET switch channel resistance in it's 'ON' condition. An external capacitor C is connected in parallel with the current-limiting resistor R in order to provide enhanced transient drive for transitioning between the modes of operation of the switch LS. When the potential at the drive node of the driver circuit rises to a high state (typically equal to the voltage supplied to the driver, VDRV), this transition from a low to high voltage is conveyed through the capacitor C into the input of the switch LS that is a PN junction diode. This provides an inrush of charge into the switch gate input that facilitates quicker turn-on. Conversely, when the drive node transitions from a high to a low state, this transition is also conveyed into the PN junction diode, and due to it's reverse-biasing nature, produces a negative voltage at the gate node given approximately by the equation below:

Equation 1: PN junction reverse-bias voltage development $$\Delta V_j = \Delta V \frac{1}{\frac{C_j}{C} + 1}$$

Where $C_j$ is an approximation for the capacitance of the PN junction in reverse bias, and the incremental voltages correspond, as differentiated by the presence of a junction-label, to the voltage variation across the junction and the voltage change at the drive node. Additionally, this negative voltage developed at the control input of the switch, that maintains the switch in it's 'OFF' state, decays into the drive node that is now at the low output potential of the driver circuits through resistor R. It will be clear to one skilled in the art that due to the presence of resistor R, that decays the turn-off potential developed as described herein, it is necessary in the prior art architecture to maximize the value of capacitor C, thereby maximizing the negative voltage developed across the PN junction control input in order to provide good margins for maintaining the turn-off condition of the power switch. Yet, in order to minimize switching losses proportional to the square of the voltage transition across a capacitor, associated with the input capacitance of device LS, as well as to facilitate external component integration, it is desirable that the value of capacitance C be substantially reduced, which, as may be shown by equation 1 above, will reduce the voltage swing at the gate junction input.

The invention drive architecture, an embodiment of which is illustrated in FIG. 2, overcomes these limitations by adopting a current based drive architecture that splits the 'static' drive path from the 'transient' drive path. With reference to FIG. 2, the wire labeled cc/cv is a current-source output from the invention drive circuits, displaying very high output impedance, feeding the appropriate current value into the PN junction gate of device LS. Transitions of device LS from one state to another are assisted by a 'transient-drive' function implemented as a separate drive path from the driver circuits through a capacitor $C_1$. The driving action of the invention is accomplished through activation of both the 'static' and the 'transient' drive pathways. A low to high transition of the output of the device D in the invention produces an inrush of charge into the PN junction of device LS, facilitating rapid turn-on. The 'static' or cc/cv drive path is simultaneously activated, providing device LS with a continuous flow of charge and a 'constant-current' that maintains it in it's 'ON' state. When the driver desires to turn device LS to it's 'OFF' state, it first shuts the cc/cv drive path down, disabling forward current flow into device LS, and then transitions the output of device D from it's high state, maintained throughout the 'ON' duration of LS, to it's low state. This negative transition is conducted through capacitor $C_1$ into the PN junction of device LS, depleting any stored charge within and producing a negative potential at the input node of device LS. This negative potential now remains unchanged due to the very high impedances presented by the 'static' drive path that has been shut down as well as the reverse-biased PN junction. This allows for a reduced value of capacitance for the 'transient drive' path, and thereby a reduced overall switched capacitance in the transient drive action.

Additionally, the invention embodiment shown in FIG. 2 derives power for the 'static drive' path from the output of the buck conversion system rather than the input power supply to the driver circuits represented as VDRV. This is advantageous because the output of buck conversion systems are typically a fraction of the input, and therefore the power consumption in the 'static drive' action of the invention is substantially lower than the same in prior art architectures. This is also feasible because buck conversion outputs powering state-of-the-art high power, high performance VLSI devices are typically close to 1.0V, exceeding the typical forward voltage drop across a PN junction for reasonable forward currents, providing voltage 'headroom' for a sourcing device that provides a forward current into a PN junction from such input voltages. For safeguarding against the non-availability of this low voltage during system startup, the invention employs a reference selection block (Ref-Selct), again referring to FIG. 2, that chooses between the input power supply VDRV or a derivative of that voltage and the buck conversion output voltage as the supply that the 'static drive' path derives current from.

While providing a constant current as the output signal of the 'static drive' path eliminates uncertainties due to input power supply and external resistor value variation, addressing the variation in JFET power switch device characteristics with temperature is also important. JFET devices operate by means of the modulation of a conducting channel by expanding or contracting depletion fields induced by the potential difference across the control gate junction. It is well known in the literature that the forward voltage across a PN junction diode diminishes by a few mV for every degree centigrade rise in temperature. In JFET power switches, this effect combined with the reduced mobility of charges in the channel results in a higher rate of increase of channel resistance with temperature, since a reducing forward potential expands the depletion field, constricting the conducting channel. The invention addresses this by providing a single circuit architecture that is capable of driving either a desired constant current or a desired constant voltage at its output. Driving an appropriate voltage value instead of a current value provides the benefit of maintaining a constant electric field across the PN junction control gate of the power switch device LS of the invention, thereby ensuring a measure of temperature independence in the value of the resistance of the power switch device channel.

An alternate embodiment of the drive circuits is shown in FIG. 4. In this embodiment, a capacitor labeled CS provides transient drive charge into power devices PJFET and NJFET through switch devices PS and NS. The drive current directions are opposite to each other for complementary power switches such as P-type JFET switches and N-type JFET switches, or alternately, PNP and NPN bipolar junction transistor power devices. When activating (turning 'on') the high-side power switch device of the buck regulator configuration shown in FIG. 4, current and charge flows from the high-side supply $V_i$ into the driving component. Capacitor CS, with a low voltage potential on it, when connected to the gate of the high-side switch device PJFET, pulls a large amount of transient charge through the gate junction of PJFET, turning it on strongly. The constant current drive Ip maintains PJFET 'on' for the necessary time duration ths(on) as shown in FIG. 5. Capacitor CS is designed such that the transient charge flowing into it through PJFET charges it to a sufficiently high voltage value appropriate for driving device NJFET in the low-side 'on' phase of the DC-to-DC conversion cycle. After the high-side device PJFET is turned off, capacitor CS is connected to the gate of the low-side NJFET device and drives a large transient current into it. As CS depletes, NJFET is maintained 'on' for the required duration by constant current $I_n$ shown in FIG. 4. Complete charge depletion in capacitor CS may be accomplished by additional circuitry integrated within the drive component.

FIG. 5 is an illustration of the functionality of a buck conversion system. It can be seen that the operation of the buck converter results in continuous current flow through the filter inductor L into the load at the output. In the duration labeled $t_{hs(on)}$, the current through inductor L increases because of the transmission of the input high voltage through switch device HS. In the duration labeled $t_{ls(on)}$, the input high voltage is removed and the inductor is connected at it's input to the system ground through switch device LS. Switch device LS continues to provide a pathway for the flow of the current through the inductor L as it decreases because of the reversal of voltage polarity across it. Device LS that conducts this 'freewheeling' current displays a voltage drop across it proportional to the current flowing through the inductor and the load as well as it's channel resistance. This voltage drop across device LS with respect to the system ground is sensed in the invention through the Phase feedback signal as shown in FIG. 2.

The invention also provides a unique ability to adapt the drive action into switch device LS to operating conditions.

The driver circuits of the invention obtain information about the operating condition of the switch device through the voltages sensed at all the terminals of the switch device and through the current flowing into it's control gate. With reference to FIG. 2, increased channel resistance value of device LS may be sensed by the voltage difference across its channel. Increased junction temperature may be sensed by the diminished value of the voltage across the PN junction for a constant current input into the device. This information derived during operation may then be employed to adapt the constant current/constant voltage drive so as to maintain the energy loss within the switch device low and overall system efficiency high. Prior art drive architectures suitable for either PN junction switch devices or MOSFET switch devices do not offer this advantage of adaptability.

The embodiment illustrated in FIG. 3 eliminates the capacitor in the transient drive path entirely by employing a negative power supply input, or a less preferred integrated negative voltage generator, to provide the negative current transient drive as well as a constant negative voltage to the switch LS, transitioning and maintaining it in it's 'OFF' state. A limitation in the prior art is in the drive mechanism necessitated by the use of n-type transistor switches for device HS. The common node between the two switch devices and the inductor rises to the value of $V_i$ in the $t_{hs(on)}$ duration indicated in FIG. 5. Since both terminals of device HS are at $V_i$ in this duration, a potential greater than $V_i$ is necessary in the hs-drv path of FIG. 3 in order to ensure that the switch device remains in it's 'ON' condition. This is accomplished by a bootstrapping action through the Phase feedback signal of FIG. 3, which is conveyed, in the prior art, through a capacitor into the high-side driver power supply. One skilled in the art can recognize that the use of a p-type JFET transistor for switch device HS and a constant current constant voltage drive of the opposite polarity enhanced with needed transient drive will eliminate the need for the prior art bootstrapping. Additionally, the opposite current flow directions in the two drive paths introduces the unique possibility of charge recycling in such an embodiment, where the current flowing in the hs-drv path of FIG. 3 can be stored as charge on a capacitor and dissipated into the cc/cv path. This dual use of charge may further enhance the overall efficiency of power conversion in the system employing the invention embodiment.

Through a pairing of a specific embodiment of the invention and a low-side (or low-side and high-side) JFET power transistors, and because of the unique ability of the invention to adapt to conditions of increased temperature in the switches, a system employing the invention can sense the average current flow through the switches as well as the voltages at all nodes of the switches. For example, in matching an embodiment to a JFET switch, information about the effective 'on-resistance' of the switch at a given input gate current and gate-to-source voltage may be stored in the embodiment in non-volatile memory. The variation in this resistance value with temperature, expected absolute values of the gate-to-source voltage for a fixed gate input current as well as the variation of this voltage with temperature may also be stored. This stored information combined with the operating conditions sensed during the operation of the embodiment and the switch in a voltage conversion system could provide an accurate estimate of the switch in-situ 'on-resistance' and thereby the average or RMS current flowing through it. One skilled in the art will recognize that the full knowledge of the operating conditions of the switches thus derived in a system employing the invention will enable the system to automatically adapt the drive currents into the switches so as to achieve maximum operating efficiency under any load or voltage conversion configuration. A sophisticated embodiment may co-package the driver and the switches in order to facilitate self-calibration as well as to estimate operating temperature with greater accuracy and to minimize parasitic element values that inhibit performance. Additionally, since the invention conceives of the use of the voltage at the output of the LC filter, it possesses knowledge of the conversion output voltage and may therefore act on it's own, varying even the frequency of the pulse-width modulated switch-actuation signals in accomplishing accurate voltage conversion at maximum efficiency without the need for any additional supervisory integrated circuit as is common in the prior art. A serial communication channel that communicates the output voltage requirements of the conversion system may in this instance replace the prior art PWM input to this sophisticated embodiment of the invention.

Although specific embodiments are illustrated and described herein, any circuit arrangement configured to achieve the same purposes and advantages may be substituted in place of the specific embodiments disclosed. This disclosure is intended to cover any and all adaptations or variations of the embodiments of the invention provided herein. All the descriptions provided in the specification have been made in an illustrative sense and should in no manner be interpreted in any restrictive sense. The scope, of various embodiments of the invention whether described or not, includes any other applications in which the structures, concepts and methods of the invention may be applied. The scope of the various embodiments of the invention should therefore be determined with reference to the appended claims, along with the full range of equivalents to which such claims are entitled. Similarly, the abstract of this disclosure, provided in compliance with 37 CFR §1.72(b), is submitted with the understanding that it will not be interpreted to be limiting the scope or meaning of the claims made herein. While various concepts and methods of the invention are grouped together into a single 'best-mode' implementation in the detailed description, it should be appreciated that inventive subject matter lies in less than all features of any disclosed embodiment, and as the claims incorporated herein indicate, each claim is to viewed as standing on it's own as a preferred embodiment of the invention.

REFERENCES

1. Power JFET technology information from Lovoltech, Inc. of Santa Clara, Calif. available at http://www.lovoltech.com.
2. Chang, D.; U.S. Pat. No. 6,661,276, 'MOSFET driver matching circuit for an enhancement mode JFET', filed: Jul. 29, 2002
3. Barcelo, et al.; U.S. Pat. No. 6,570,372, 'Constant-current/constant-voltage current supply', filed: Mar. 27, 2002
4. Barcelo, et al.; U.S. Pat. No. 6,522,118, 'Constant-current/constant-voltage current supply', filed: Apr. 18, 2001
5. Itoh, et al.; U.S. Pat. No. 6,414,854, 'Driving device and method of switching element in power conversion apparatus using current-controlled semiconductor switching element', filed: Sep. 7, 2001
6. Karaki, et al.; U.S. Pat. No. 6,429,701, 'Drive circuit for semiconductor power device and semiconductor switching circuit using the drive circuit', filed: Dec. 26, 2000.

What is claimed is:

1. An integrated electronic circuit, comprising:
a plurality of integrated semiconductor and other electronic devices for driving power switch transistors with PN-junction control inputs;
a first drive output circuit that provides as a first drive signal either a constant current or a constant voltage signal;
a second drive output circuit that provides a second drive signal, comprised of a change in voltage and flow of charge, each of magnitude substantially greater than corresponding electrical signals provided by the first drive output circuit, that is coupled into the first drive signal;
a first power supply input;
a second power supply input, substantially lower in voltage value than the voltage of the first power supply input;
a power supply selection circuit that selects either, or both, of the first and the second power supply inputs;
and a common electronic package or semiconductor substrate that integrates the first drive circuit, the second drive circuit, the power supply selection circuit, and associated other electronic circuits and devices.

2. The apparatus of claim 1 where the second power supply input is derived as the filtered output voltage of a buck DC-to-DC conversion system employing this embodiment.

3. The apparatus of claim 1 where the second drive signal is coupled into the first drive output path through a capacitor.

4. The apparatus of claim 1 in a switched DC-to-DC conversion system, where the phase node common to the switches and the filter inductor is connected as an input.

5. The apparatus of claim 1, connecting to the gate of a JFET switch with a channel of n-type semiconductor material.

6. The apparatus of claim 1, connecting to the gate of a JFET switch with a channel of p-type semiconductor material.

7. The apparatus of claim 1, with a plurality of drive output paths, each combining constant current constant voltage drive action with independent transient drive action, driving corresponding PN-junction gate switch devices in any voltage conversion system.

8. The apparatus of claim 1, with a plurality of drive output paths, each combining constant current constant voltage drive action with independent transient drive action, driving a p-type JFET switch employed as the high-side switch of a DC-to-DC buck conversion system, and an n-type JFET switch employed as the low-side switch of the buck conversion system.

9. The apparatus of claim 1, with a plurality of drive output paths, each combining constant current constant voltage drive action with independent transient drive action, driving a p-type JFET switch employed as the high-side switch of a DC-to-DC buck conversion system, and an n-type JFET switch employed as the low-side switch of the buck conversion system, where control input current for one of the driven power switches is stored as charge on a capacitor and dissipated as control input current into the other power switch.

10. The apparatus of claim 1 employing a third power supply input, of polarity opposite to that of the first power input, to provide negative transient current flow and negative constant voltages in driving any output.

11. The apparatus of claim 1 employing an integrated reference voltage generator circuit that generates a voltage of polarity opposite to that of the first power supply input to provide negative transient current flow and negative constant voltages in driving any output.

12. The apparatus of claim 1 and a discrete power transistor switch or switches employed for switched DC-to-DC conversion co-packaged with the invention embodiment and sharing a common heat dissipation path.

13. The apparatus of claim 1 with non-volatile memory storing the operating characteristics of the driven switches co-packaged or integrated on the same semiconductor substrate.

* * * * *